US012806579B2

(12) United States Patent
Zeller

(10) Patent No.: US 12,806,579 B2
(45) Date of Patent: Nov. 24, 2026

(54) SINTERED POROUS BODY WITH MULTIPLE LAYERS

(71) Applicant: ENTEGRIS, INC., Billerica, MA (US)

(72) Inventor: Robert S. Zeller, Boston, MA (US)

(73) Assignee: ENTEGRIS, INC., Billerica, MA (US)

( * ) Notice: Subject to any disclaimer, the term of this patent is extended or adjusted under 35 U.S.C. 154(b) by 324 days.

(21) Appl. No.: 18/389,459

(22) Filed: Nov. 14, 2023

(65) Prior Publication Data

US 2024/0157309 A1 May 16, 2024

Related U.S. Application Data

(60) Provisional application No. 63/425,164, filed on Nov. 14, 2022.

(51) Int. Cl.
*B01D 53/22* (2006.01)
*B01D 63/06* (2006.01)
(Continued)

(52) U.S. Cl.
CPC ....... *B01D 71/02232* (2022.08); *B01D 63/06* (2013.01); *B01D 67/00411* (2022.08); *B01D 69/02* (2013.01); *B01D 69/04* (2013.01); *B01D 69/12* (2013.01); *B22F 1/056* (2022.01); *B22F 3/16* (2013.01); *B22F 7/002* (2013.01); *B01D 2323/10* (2013.01); *B01D 2325/0231* (2022.08); *B01D 2325/0233* (2022.08); *B01D 2325/04* (2013.01); *B01D 2325/20* (2013.01); *B22F 2301/15* (2013.01); *B22F 2301/35* (2013.01); *B22F 2304/054* (2013.01); *B22F 2304/10* (2013.01); *B22F 2998/10* (2013.01); *B22F 2999/00* (2013.01)

(58) Field of Classification Search
CPC ........ B01D 71/02232; B01D 67/00411; B01D 63/06; B01D 69/02; B01D 69/04; B01D 69/12; B01D 2325/0233; B01D 2325/0231; B01D 2323/10; B01D 2325/04; B01D 2325/20; B22F 1/056; B22F 3/16; B22F 7/002; B22F 2301/35; B22F 2304/054; B22F 2304/10; B22F 2998/10; B22F 2999/00
See application file for complete search history.

(56) References Cited

U.S. PATENT DOCUMENTS 3,158,472 A * 11/1964 Ludwig .................. C22C 33/02 419/33
4,186,100 A * 1/1980 Mott ...................... B01D 69/04 210/510.1
(Continued)

FOREIGN PATENT DOCUMENTS

CN 102395420 A 3/2012
CN 102489707 A 6/2012
(Continued)

OTHER PUBLICATIONS

Babalola "Sintering of nanocrystalline materials: Sintering parameters" Heliyon 9 (2023) 13 pages (Year: 2023).*

*Primary Examiner* — Anthony Shumate

(57) ABSTRACT

Described are porous sintered metal membranes that include multiple layers made from different metal particles, that may be useful as filter membranes, and methods of making and using the porous sintered metal membranes.

14 Claims, 7 Drawing Sheets

(51) Int. Cl.

| | |
|---|---|
| ***B01D 67/00*** | (2006.01) |
| ***B01D 69/02*** | (2006.01) |
| ***B01D 69/04*** | (2006.01) |
| ***B01D 69/12*** | (2006.01) |
| ***B01D 71/02*** | (2006.01) |
| ***B22F 1/054*** | (2022.01) |
| ***B22F 3/16*** | (2006.01) |
| ***B22F 7/00*** | (2006.01) |

(56) References Cited

U.S. PATENT DOCUMENTS

| | | | | |
|---|---|---|---|---|
| 5,364,586 | A | 11/1994 | Trusov et al. | |
| 7,112,237 | B2 | 9/2006 | Zeller et al. | |
| 9,149,750 | B2 | 10/2015 | Steele et al. | |
| 2004/0137209 | A1* | 7/2004 | Zeller | B01D 67/00411 428/304.4 |
| 2008/0261067 | A1* | 10/2008 | Okamoto | B22F 7/004 428/548 |
| 2014/0209533 | A1 | 7/2014 | Matviychuk et al. | |
| 2015/0337423 | A1* | 11/2015 | Martin | B22F 1/05 75/252 |
| 2018/0214949 | A1* | 8/2018 | Martin | B22F 1/054 |
| 2018/0214991 | A1* | 8/2018 | Yahata | B23K 35/286 |
| 2018/0272426 | A1* | 9/2018 | Martin | B01F 33/401 |
| 2020/0188858 | A1* | 6/2020 | Zeller | B01D 67/00411 |
| 2021/0069792 | A1* | 3/2021 | Zeller | B01D 39/2044 |
| 2021/0213530 | A1* | 7/2021 | Kuboyama | B22F 1/054 |
| 2023/0347300 | A1* | 11/2023 | Zeller | B01D 69/12 |

FOREIGN PATENT DOCUMENTS

| | | | |
|---|---|---|---|
| CN | 105622079 | B | 10/2016 |
| CN | 111359450 | A | 7/2020 |
| CN | 112440025 | A | 3/2021 |
| CN | 213253545 | U | 5/2021 |
| CN | 222492169 | U | 2/2025 |
| JP | 2004136279 | A | 5/2004 |
| KR | 20040036618 | A | 4/2004 |
| WO | 2008042063 | A2 | 4/2008 |
| WO | 2010148051 | A2 | 12/2010 |

* cited by examiner

SINTERED POROUS BODY WITH MULTIPLE LAYERS

FIELD

The disclosure relates to porous sintered metal membranes that include multiple layers made from different metal particles, that may be useful as filter membranes, and methods of making and using the porous, sintered metal membranes.

BACKGROUND

Porous, sintered metal bodies find uses in a variety of industrial applications, including as filters to remove impurities from fluids used in manufacturing. Many manufacturing processes require extremely pure fluids as raw materials or as processing fluids. For example, many different phases of semiconductor and microelectronic device manufacturing require the use of highly pure gases or liquids as raw materials, and highly pure processing fluids for steps such as cleaning, etching, and other surface preparation steps. To provide highly pure fluids during manufacturing, filters are often used to remove contaminants from fluids immediately before use of the fluid.

The fluid may be in the form of a gas or a liquid, or a supercritical fluid. Supercritical carbon dioxide has a variety of uses in industry, including for cleaning and solvent extraction applications. Highly pure, supercritical carbon dioxide may be used in the electronics and semiconductor manufacturing industries, which require extremely high cleanliness and purity of materials. In one such application, supercritical carbon dioxide may be used to remove photoresist material from surfaces of semiconductor wafers. Commonly, a supply of supercritical carbon dioxide is filtered, prior to use, to be free of particulate impurities at a low-nanoscale level, for example by being filtered to remove particles in a size range of 10 or 20 nanometers, or smaller.

Carbon dioxide ($CO_2$) exists as a supercritical fluid at temperatures and pressures above its critical temperature (31.10° C., 87.98° F., 304.25 K) and critical pressure (7.39 MPa, 72.9 atmosphere, 1,071 pounds per square inch, 73.9 bar). Typical operating conditions for processes of filtering supercritical carbon dioxide include a temperature of over 70, 90, or 100 degrees Celsius, and a pressure over 25, 30, 35, or 40 megapascals (MPa).

Equipment used to process and filter supercritical carbon dioxide must be designed to survive and function at temperatures and pressures required to maintain carbon dioxide in a supercritical state. These conditions are significantly more severe than conditions used for filtering many other types of industrial raw materials or process fluids. Many filtering steps of other fluids occur at ambient or only slightly elevated temperatures, and at pressures that are approximately atmospheric pressure, slightly above atmospheric pressure, or well below atmospheric pressure. Consequently, developing new, useful, and improved methods and equipment for filtering supercritical fluids such as supercritical carbon dioxide can be particularly challenging, because equipment and components such as filter membranes must be stable and durable over a useful operating lifetime at relatively high pressures and temperatures.

SUMMARY

Described as follows are porous sintered metal membranes that can be used as filter membranes for filtering a flow of fluid to remove an impurity from the fluid. Also described are methods for preparing a porous sintered metal membrane, and methods of using a porous sintered membrane for filtering a flow of fluid.

Porous metal membranes are commonly prepared by techniques that include forming a thin compressed body from metal particles and sintering the compressed body to cause the particles to become fused together at their surfaces. The particles often include particles on a nanometer size scale, referred to as "nanoparticles," because nanoparticles can produce membranes that have pores on a nanometer size scale. Various techniques use a compression step at very high pressure, e.g., many thousands of pounds per square inch, which causes the compressed membrane to be relatively dense, e.g., having a porosity ("void space") that is below 20 percent.

Higher porosity filter membranes may be more desirable than lower porosity membranes for various applications, if a useful balance of performance can still be achieved. The effectiveness of a filter membrane in removing particles from a fluid can be measured by properties that include bubble point, flux, and retention. Bubble point is a property that is associated with pore size of a membrane. A higher bubble point is associated with smaller pores and better filtering properties. Flux is a measure of a rate of flow that may pass through a membrane. A high flux and relatively high flow can be desired, and may be associated with a relatively high porosity. Retention refers to an amount (as a percentage) of impurity particles in a fluid that is removed by a filter membrane. A filter membrane must exhibit a level of retention that is useful in a commercial application. Ideally, a filter membrane used for filtering supercritical carbon dioxide would exhibit a high bubble point (associated with small pore size) in combination with a high flow rate (associated with relatively high porosity).

While producing sintered membranes by techniques that include sintering a compressed body, the step of sintering the membrane can sometimes produce imbalanced forces that may cause physical instability and the potential of the membrane cracking. During sintering, bonds between metal particle surfaces form by movement of material between the surfaces. Associated with the formation of bonds between particle surfaces is a decrease in volume of the body that is being sintered, referred to as "sinter shrinkage." Sinter shrinkage of a metal body having different layers that shrink at different rates may produce internal stresses in the layers or body, which may result in cracking of the body.

Various approaches have been used to reduce the tendency of a multi-layer body to crack during sintering. By one technique, the different layers of a multi-layer body share at least one type (based on size and chemical makeup) of particle between the layers, to increase the homogeneity of the layers and produce similar sinter shrinkage in the two layers. In example membranes and methods, an amount of coarse particles (particles having an average size greater than 1 micron, e.g., greater than 5 or 20 microns) that are used to form a coarse layer may be added to a fine layer to cause the two layers to have similar shrinking behavior during sintering.

According to membranes and methods as described, a membrane can be prepared to be stable during sintering by a novel technique, which is to select metal particles for the different layers to have similar sinter shrinkage properties, without adding an amount of particles of the coarse layer to the fine layer. Advantageously, a fine layer may be made entirely or nearly entirely of nanoparticles, which allows the fine layer to be prepared to have a relatively higher porosity and high flow, in combination with small pores and a high bubble point. Similar shrinking behavior of particles of different layers can be achieved based on the sintering points of the different particles. In example methods and membranes, fine particles of a fine layer can have a sintering point that is higher than a sintering point of coarse particles of a coarse layer.

In one aspect, this description relates to a multi-layer porous sintered membrane. The membrane includes: a coarse layer comprising sintered microparticles, the microparticles having a microparticle sintering point, the coarse layer having a coarse layer porosity; and a fine layer comprising sintered nanoparticles, the nanoparticles having a nanoparticle sintering point, the fine layer having a fine layer porosity, the nanoparticle sintering point being greater than the microparticle sintering point, and the fine layer porosity being greater than the coarse layer porosity.

In another aspect the disclosure relates to a method. The method includes: compressing microparticles into a coarse layer using a first compression pressure, the microparticles having a microparticle sintering point; and forming a fine layer on the coarse layer by applying nanoparticles to the coarse layer and compressing the nanoparticles using a second compression pressure that is lower than the first compression pressure, to form a precursor comprising the coarse layer and the fine layer. The nanoparticles have a nanoparticle sintering point that is greater than the microparticle sintering point.

BRIEF DESCRIPTION OF THE DRAWINGS

FIGS. 1 and 4 are schematic and are not necessarily to scale.

DETAILED DESCRIPTION

Figure 1:
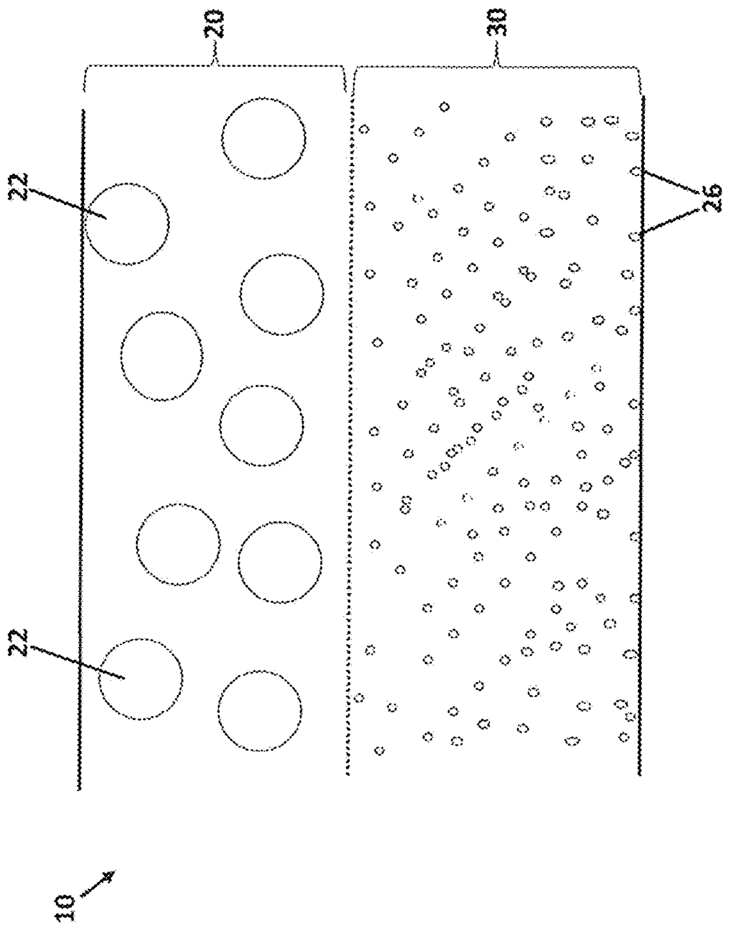
FIG. 1 shows an example multi-layer membrane as described.

The following describe novel porous sintered metal membranes (e.g., "porous membranes," "porous sintered membranes," or sometimes simply "membrane" herein) that can be useful as filter membranes for filtering a flow of a fluid to remove an impurity from the fluid. Also described are novel and inventive methods for preparing a porous sintered membrane as described, and novel and inventive methods of using a porous sintered membrane as described for filtering a flow of fluid.

The porous sintered membrane is in the form of a porous metal body that contains two (at least) layers made of sintered metal particles: a first layer that is derived mostly or entirely from coarse metal particles referred to herein as "coarse particles" or "microparticles," and a second layer that is derived mostly or entirely from fine metal particles referred to herein as "fine particles" or "nanoparticles." Each layer is made of a metal matrix that contains metal particles that have become interconnected at surfaces of the particles by a sintering step.

The first layer (sometimes referred to as a "support layer" or a "coarse layer") has larger pore openings with a lower porosity compared to the second layer, and functions as a component of the overall support structure of the multi-layer membrane while still allowing for good flow properties through the membrane. The second layer (sometimes referred to as a "filter layer" or a "fine layer") has smaller pore openings with a higher porosity as compared to the support layer, functions as a filter layer, and can contribute to the overall strength to the membrane.

The two layers of the membrane are made from different types of metal particles. The support layer is made from relatively larger particles, referred to as "coarse" particles, and the filter layer is made of smaller particles referred to as "fine particles" or "nanoparticles." Based on the construction of the two layers, the membrane can exhibit useful or advantageous performance properties as a filter membrane. The relatively small pores of the filter layer produce a relatively high bubble point. Yet the filter layer also has a relatively high porosity, which allows for good flow through the membrane and a desirable or advantageous combination of high bubble point and high flow.

Also described are novel methods of preparing the multi-layer membrane. Useful methods form a precursor that contains two layers, one made with fine particles and one made with coarse particles. The precursor can be processed by sintering the multi-layer precursor with a single sintering step that causes sintering of the particles of both layers at the same time and without allowing the membrane to crack during sintering.

During a sintering step, metal particles of a precursor are bonded together at adjacent surfaces by heating the precursor to cause metal at the adjacent surfaces to fuse together. Transfer of metal between adjacent particle surfaces to form the bond also causes dimensional changes in the precursor membrane in the form of "sinter shrinkage." Because metal from adjacent particles diffuses to form bonds or a "bridges" between the particles, the dimensions of the particles change slightly, resulting in shrinkage (i.e., "sinter shrinkage") of the precursor. If the different layers of a multi-layer membrane exhibit different rates of shrinkage during sintering, un-even rates of dimensional change of the different layers can cause the membrane to crack.

To prevent cracking that may occur from sinter shrinkage, novel multi-layer membranes can be prepared by forming different layers from particles of different metals, with the different metals being selected to exhibit similar amounts of dimensional change ("sinter shrinkage") during sintering. The metal particles of a fine layer and the metal particles of a coarse layer are chosen to cause the different layers to shrink during sintering at similar rates and to be less susceptible to force imbalances and cracking.

The shrinking properties of the different layers can be controlled by selecting the particles of the two different membrane layers to have different sintering points. For example, to provide different layers with shrinking properties that are sufficiently similar to avoid cracking due to sinter shrinkage, particles of a coarse layer can have a sintering point that is lower than a sintering point of the particles of the fine layer.

Additionally, sinter shrinkage can be affected by the amount of contact between adjacent particles of a precursor that form the bond or "bridge" between contacting surfaces. Amounts of contact between particles of a precursor can be affected by the amount of pressure that is used to compress particles to form the precursor. As described herein, nanoparticles of a precursor can be compressed at relatively low pressure to produce low or minimal contact between nanoparticles of the precursor; the amount of contact between the compressed nanoparticles of a fine layer can be sufficient to form a cohesive precursor that can also be formed into a fine layer of a membrane by a sintering step, but need not be significantly greater. In contrast, microparticles of a coarse layer can be compressed at a relatively higher pressure to form a higher amount of contact between the coarse particles, and sintering is enhanced.

Based on the foregoing, various features of particles and compression steps can be used to provide a desired porous sintered membrane. For a fine layer, nanoparticles may be selected that are less diffusionally-active than coarse particles of the coarse layer, i.e., nanoparticles may have a higher sintering temperature compared to the sintering temperature of the coarse particles. Additionally, the nanoparticles can be formed into a precursor by compacting the nanoparticles at a pressure that is relatively low or minimized so that diffusion of metal between contacting particle surfaces is limited by a fewer number of relatively smaller contact points between the compressed nanoparticles of the precursor. Additionally, the sintering of the coarse layer is affected by forming the coarse layer precursor using a relatively higher compression pressure to form higher number of contacting surfaces between microparticles. These factors can be adapted to particles of a precursor to produce two layers (a fine layer and a coarse layer) of a multi-layer precursor that will shrink at similar rates during sintering to prevent cracking of the membrane during sintering.

A porous sintered membrane as described is a porous metal structure that includes a metal matrix (or simply "matrix") that is derived from and therefore is described as "including" (e.g., comprising, consisting of, or consisting essentially of) metal particles that have been connected together (e.g., "interconnected") at their surfaces by a step of sintering the particles (i.e., "sintered metal particles"). The particles are fused together at their surfaces to form the interconnected matrix by a step of sintering a precursor body that contains layers of the metal particles in an un-sintered, compressed condition.

The term "sintering" as used herein has a meaning that is consistent with the meaning that this term is given when used in the arts of porous sintered metal structures, such as porous sintered metal membranes of the type that are useful as a metal filter membrane. Consistent therewith, the term "sintering" can be used to refer to processes of bonding (e.g., "welding" or "fusing") together a collection of small metal particles of one or more different types (sizes, compositions, shapes, etc.) by applying heat to a non-sintered precursor that includes the particles, so that the particles reach a temperature that causes the particles to become fused together by metal bonds formed between surfaces of adjacent particles, but that does not cause the particles to melt, i.e., the metal particles that are subject to sintering do not reach a melting temperature or become a flowable liquid.

As used herein, a "sintering point" of a collection of metal particles is a temperature at which particles within the collection begin to adhere to one another at an appreciable rate, i.e., a temperature at which particles of the collection begin to fuse together at the contacting surfaces without melting, to form a porous interconnected matrix, at a particular pressure such as at atmospheric pressure. Unless noted otherwise, sintering points and sintering temperatures as described are given for a process performed as particles are at a condition of atmospheric pressure, without external pressure being applied to the particles.

Each of the fine particles for forming a fine layer, and the coarse particles for forming a coarse layer, has a characteristic sintering point. According to certain example methods and membranes, a sintering point of the fine particles can be higher than a sintering point of the coarse particles. The difference between a sintering point of the fine particles and a sintering point of the coarse particles may be at least a few degrees Celsius, or may be relatively large difference, such as a difference that is at least, or is greater than 20, 50, or 100 degrees Celsius. Example fine particles and coarse particles of a porous sintered membrane may have sintering points that differ by at least 1 or 2 degrees Celsius, or by less than or greater than 20, 50, or 100 degrees Celsius.

A collection of particles may be processed by sintering over a range of effective temperatures that includes the sintering point and temperatures above the sintering point but below the melting temperature of the particles. The range of temperatures useful for sintering the fine particles includes a range of temperatures that is also useful for sintering the coarse particles. In useful methods, all or substantially all of the metal particles of a fine layer and a coarse layer are capable of being sintered at a single sintering temperature that can be used in a single sintering step.

Useful sintering points of each type of particle can be typical of sintering points of known metal particles, such as temperatures that are above 700, 800, or 1000 degrees Celsius. A temperature used for a sintering step (i.e., a "sintering temperature") to prepare a particular membrane as described, having particles of different chemical makeups, sizes, and different sintering points, will be a sintering temperature that is higher than the sintering point of both types of particles, and that is below the melting temperature of both types of particles. A preferred sintering temperature may be at a middle portion of a range of temperatures that may be effective to cause sintering of each of the two types of particles. A sintering temperature in this range can avoid excessive flow or deformation of the different particles during sintering, which could affect (reduce) the eventual porosity of the sintered layers. A sintering temperature in a middle portion of a range of useful sintering temperatures may effectively produce a multi-layer sintered membrane that has fine layer porosity (relatively high) and pore size (relatively low) features as described, and the support layer having a porosity as described.

The multi-layer porous sintered membrane includes two identifiable portions or "layers" made from different types of metal particles. Without limiting the function of the different layers, a first layer is sometimes referred to herein as a "coarse layer" or a "support layer," and a second layer is sometimes referred to as a "fine layer" or a "filtering layer." The coarse layer can be made from mostly or entirely coarse metal particles, e.g., at least 50, 60, 70, 80, 90, or 99 percent coarse metal particles based on total weight coarse layer. The fine layer can be made significantly or entirely from "fine" metal particles or "nanoparticles," e.g., at least 90, 95, or 99 percent fine metal particles based on total weight fine layer.

The two different layers may be detected visually, using magnification, as part of a multi-layer porous sintered membrane (or a precursor, see below). The coarse layer made from mostly or entirely coarse particles will be viewable as containing only or mostly coarse particles bonded together at particle surfaces by a sintering step. The fine layer made significantly or entirely from fine particles will be viewable as containing entirely or nearly entirely fine particles bonded together at particle surfaces by a sintering step. The coarse layer will have a lower porosity compared to the fine layer. The fine layer will have smaller pore sizes compared to the coarse layer.

Non-limiting examples of metal particles that can be useful as microparticles of a coarse layer include metal particles made of any metal (which includes pure metals and alloys), for example stainless steel, another iron or steel alloy, nickel or a nickel alloy, titanium or titanium alloy, etc. According to specific example membranes, a coarse layer may be made from (e.g., comprise, consist of consist essentially of) particles that all contain or consist of the same type of metal, such as stainless steel, e.g., a collection of microparticles used to make a coarse layer may contain a least 80, 90, 95, or 99 weight percent particles made of the same metal material, for example stainless steel particles, based on total weight microparticles of the coarse layer.

Microparticles that are used to form a filter layer begin in the form of a collection of microparticles that have one or more common general physical characteristics such as shape, size, and chemical makeup. The collection of microparticles is substantially dry and flowable, and most or all of the particles are compositionally similar or identical, e.g., made of a single type of metal (including alloys).

A collection of microparticles that is used to form a coarse layer may all be of a similar shape, or, alternately, may include microparticles of two or more different shapes (e.g., granular, elongate, fibrous, or dendritic). The collection of microparticles may have sizes that fit within a single particle size distribution in the shape of a bell curve, e.g., are "mono-modal," or alternately may have sizes that define two distinct particles size distributions, i.e., the collection may have a bi-modal particle size distribution.

Useful microparticles may have a "granular" shape, meaning that the particles are individual particles that may be considered spheroidal, unbranched, and non-elongate, for example having flat surfaces or rounded surfaces and corners or edges that may be rounded or angled. Granular particles are not branched or dendritic, and have an aspect ratio of less than 5, or less than 3, or less than 1.5.

Examples of useful collections of microparticles used to form a coarse layer may be made from (e.g., comprise, consist of, or consist essentially of) substantially all granular microparticles of a single type of metal. Example collections include (e.g., comprise, consist of consist essentially of) microparticles that have a particle size distribution in the form of a single, mono-modal, "normal" or "Gaussian" distribution curve and average particles size (D50) greater than 1 micron. Examples of useful average particle sizes of a collection of microparticles may be from 1 micron to 100 microns, e.g., from 1 micron to 20 microns or from 1 micron to 5 or 10 microns. Particle size of metal particles can be measured by ASTM B822-17 (Standard Test Method for Particle Size Distribution of Metal Powders and Related Compounds by Light Scattering).

According to other example membranes, a coarse layer may be made from (e.g., comprise, consist of, or consist essentially of) a collection of microparticles having granular shapes (at least 80, 90, 95, or 99 percent granular microparticles) that have a bimodal particle size distribution. The collection includes two different collections of granular microparticles, each having a single, mono-modal, "normal" or "Gaussian" distribution curve. A majority of the microparticles (e.g., at least 50, 60, 70, or 80 percent of the microparticles) can have an average particle size (D50) in a range from 1 to 50 microns, e.g., from 1 to 10 microns, and a minor amount of the microparticles (e.g., less than 50, 40, 30, or 20 percent of the microparticles) can have a larger average particle size, e.g., an average particle size (D50) in a range from 50 to 100 microns or from 10 to 99 microns.

According to other example membranes, a coarse layer may be made from (e.g., comprise, consist of, or consist essentially of) a combination of granular microparticles and non-granular particles. Non-granular particles include particles that are branched or dendritic or have an aspect ratio of greater than 5 or greater than 10. A majority of the microparticles (e.g., at least 50, 60, 70, or 80 percent of the microparticles) can have a granular shape, and a minor amount of the microparticles (e.g., less than 50, 40, 30, or 20 percent of the microparticles) can have a non-granular shape that is branched or dendritic or have an aspect ratio of greater than 5 or greater than 10.

Non-limiting examples of metal particles that can be useful as nanoparticles of a fine layer include metal particles made of any metal (which includes pure metals and alloys), for example stainless steel, another iron or steel alloy, nickel or a nickel alloy, titanium or titanium alloy, etc. A sintering point of the nanoparticles is higher than the sintering point of the microparticles of the coarse layer.

Nanoparticle that are used to form a fine layer begin in the form of a "collection" of nanoparticles, meaning a volume of individual solid nanoparticles that have certain common general physical characteristics such as shape, size, and chemical makeup. The collection of particles is substantially dry and flowable, e.g., a "powder," with the particles being movable relative to each other and with air space existing between the particle surfaces. Most or all of the particles are compositionally similar or identical, e.g., made of a single type of metal material, with particle sizes that fit within a particle size distribution in the shape of a bell curve.

According to certain example membranes, a fine layer may be made from (e.g., comprise, consist of consist essentially of) a collection of particles that are all or substantially all nanoparticles, and that are all of substantially all of a single type of metal material. The nanoparticles may be, for example, stainless steel particles, e.g., at least 80, 90, 95, 99 weight percent particles that are made stainless steel based on total nanoparticles used to form a fine layer.

The nanoparticles may have a particle size distribution in the form of a "normal" or "Gaussian" distribution curve. Accordingly, a plot of the frequency (percent, y-axis) of particles within a collection of particles over the range of sizes (diameters) of the particles (x-axis, on a logarithmic scale) in a collection forms a bell-shaped curve. The curve is characterized by a paricle size (diameter) distribution that is in the form of a continuous curve that is bell-shaped or approximately bell-shaped (e.g., Gaussian), having a minimum particle size at one end of the curve, a maximum particle size at a second end of the curve, a single peak (maxima) between the first and second ends, a continuous and gradually increasing curve between the first end and the single peak, and a continuous and gradually decreasing curve between the single peak and the second end.

The average particles size (D50) of the particles in the collection of nanoparticles can be an average particles size that is useful in a filter layer as described. Examples of useful average particle sizes of a collection of nanoparticles may be less than 1 micron, e.g., less than 500 nanometers, and preferably in a range from 10 to 150 or 200 nanometers. Particle size of fine particles can be measured using ASTM B822-17 (Standard Test Method for Particle Size Distribution of Metal Powders and Related Compounds by Light Scattering (Used for particle sizes <45 microns).

Examples of useful nanoparticles have a significantly round or spherical shape, with an aspect ratio of less than 3, less than 2, or less than 1.5.

A porous sintered membrane and the layers thereof may have porosity properties that will allow the porous sintered body to be effective for a desired use, e.g., as a filter membrane. For use as a filter membrane, especially to allow for filtering a flow of fluid at a desirably high flow rate, a coarse layer as described can preferably have a porosity in a range from 10 to 30 percent, e.g., from 10 to 20 percent. A fine layer of the membrane may have a porosity that is higher than the porosity of the coarse layer, with example porosity values of a fine layer being at least 25 percent, e.g., in a range from 25 to 45 percent or from 30 to 40 percent.

As used herein and in the art of porous sintered bodies a "porosity" of a porous sintered body (also sometimes referred to as "void fraction") is a measure of the void (i.e., "empty") space in the body as a percent of the total volume of the body, and is calculated as a fraction of the volume of voids of the body over the total volume of the body. A body that has zero percent porosity is completely solid.

A sintered membrane can include (i.e., comprise, consist of, or consist essentially of) the coarse layer and the fine layer as described. The total membrane thickness, and the relative thicknesses of the coarse and fine layers of a membrane can be any that are useful. A coarse layer may have a thickness that will provide support for the fine layer without unduly restricting fluid flow through the body. The fine layer may have a thickness that provides desired filtering performance and that also provides good strength in a membrane, especially a tubular membrane.

A total thickness of a porous sintered membrane for use as a filter membrane can be relatively thin, e.g., have a thickness that is relatively small in magnitude, such as on a scale of microns. A thin filter membrane can result in certain desired properties that included reduced mass and a reduced pressure drop across the filter during use. Examples of useful or preferred porous sintered membranes for filtering a supercritical fluid such as supercritical carbon dioxide can have a thickness that is below 2000 or 1500 microns, e.g., from 800 or 1000 up to 1200 or 1500 micron.

In examples porous sintered membranes, a coarse layer may be either thicker than or thinner than a fine layer, and may preferably be thicker. According to certain examples, a porous sintered membrane can have a coarse layer that has a thickness that is at least 50 percent of a total thickness of the membrane, e.g., at least 55, 60, 70, or 80 percent of the total thickness of the membrane. The fine layer can have a thickness that less than 50 percent of a total thickness of the membrane, such as less than 50, 40, 30, 20, or 10 percent of a total thickness of the membrane.

Certain more specific examples of multi-layer membranes may have a coarse layer that has a thickness in a range from 500 to 1000 microns, e.g., from 600 to 900 microns. These membranes may also have a fine layer that has a thickness or less than 500 microns, e.g., a thickness in a range from 2 microns to 300 microns.

The porous membrane contains the coarse layer, the fine layer, and may optionally contain but does not require other layers or materials. According to certain embodiments, a porous sintered body may be made to consist of or to consist essentially of only the coarse and the fine layers. A porous sintered body that "consists essentially of" the coarse layer and the fine layer contains these two layers and not more than an insignificant amount of any other layer or material, e.g., not more than 5, 3, 1, 0.5, or 0.1 weight percent of any other layer or material.

A filter membrane that comprises, consists of, or consists essentially of a porous sintered membrane as described can include a useful surface area through which fluid flows, which can preferably be sufficiently high to allow for desired filtering performance features during use such as a low pressure drop, a desirably high bubble point, a desirably high flow rate of fluid through the filter, and a useful removal efficiency (as reflected by LRV).

Exemplary porous sintered membranes can be formed as a filter membrane that is in the form of a flat sheet, or alternately as a three-dimensional shape such as in the form of a cup, cone, an open tube (open at two opposed ends), or closed-end tube (a.k.a. "closed cylinder," meaning a tube or cylinder having one closed end and one open end). A particular example of a filter body useful for filtering supercritical carbon dioxide can be an open cylinder filter membrane, i.e., a tube, having a length in a range from 10 to 100 millimeters, and a diameter in a range from 0.5 to 2 inches, such as in a range from 0.75 to 1.5 inches.

A porous membrane of this description can have a bubble point that is useful to allow the body to be effective in filtering a fluid, for example a supercritical fluid such as supercritical carbon dioxide. Examples of useful or preferred bubble points of a membrane can be at least 40, 50, 55 or 60 pounds per square inch measured by ASTM E128-99, measured by using isopropyl alcohol and water (60/40).

Bubble point was measured according to ASTM Standard E-128 using isopropyl alcohol (IPA) as a test liquid. The material to be tested was completely soaked with wetting solution and then placed in a fixture which seals the circumference but leaves one surface visible and the other sealed. Air pressure was applied to the sealed side of the material. The pressure at which a bubble formed on the visible surface was recorded.

A porous membrane of this description can have a flow property, meaning an ability to allow flow of a fluid through the membrane, that is useful to allow the membrane to be effective in filtering a fluid, for example a supercritical fluid such as supercritical carbon dioxide. Flow may be measured as a volume of flow per unit area of a filter membrane at a given pressure of the fluid. Examples of useful or preferred flow rates of fluid through a membrane as described can be at least 0.10, or at least 0.12 or at least 0.15 standard liters per minute (slpm) per square centimeter, tested using air at a pressure of 30 pounds per square inch.

Flow through a membrane can be measured by an air permeability test, as follows. The membrane to be tested is fixed in an enclosing housing and air flow was controlled using a mass flow meter. The flow was adjusted until the inlet pressure (measured by a pressure gage or transducer) was at the specified value. Air flow was measured at an upstream pressure of 200 kPag (2 BARG) at 20° C. with a downstream pressure of 0 kPag (0 BARG), i.e., atmospheric pressure, through a membrane with a known frontal area, and was expressed of units of slpm/cm2 (flow per unit area).

FIG. 1 schematically shows a side, cut-away view of a portion of a multi-layer porous sintered membrane. Membrane 10 includes coarse layer 20 made mostly or entirely of coarse particles 22. Membrane 10 also includes fine layer 30 made mostly or entirely of fine particles 26. The sintered particles are interconnected at surfaces of the particles (not shown) to form a metal matrix that makes up the multi-layer porous sintered membrane.

Figure 2A:
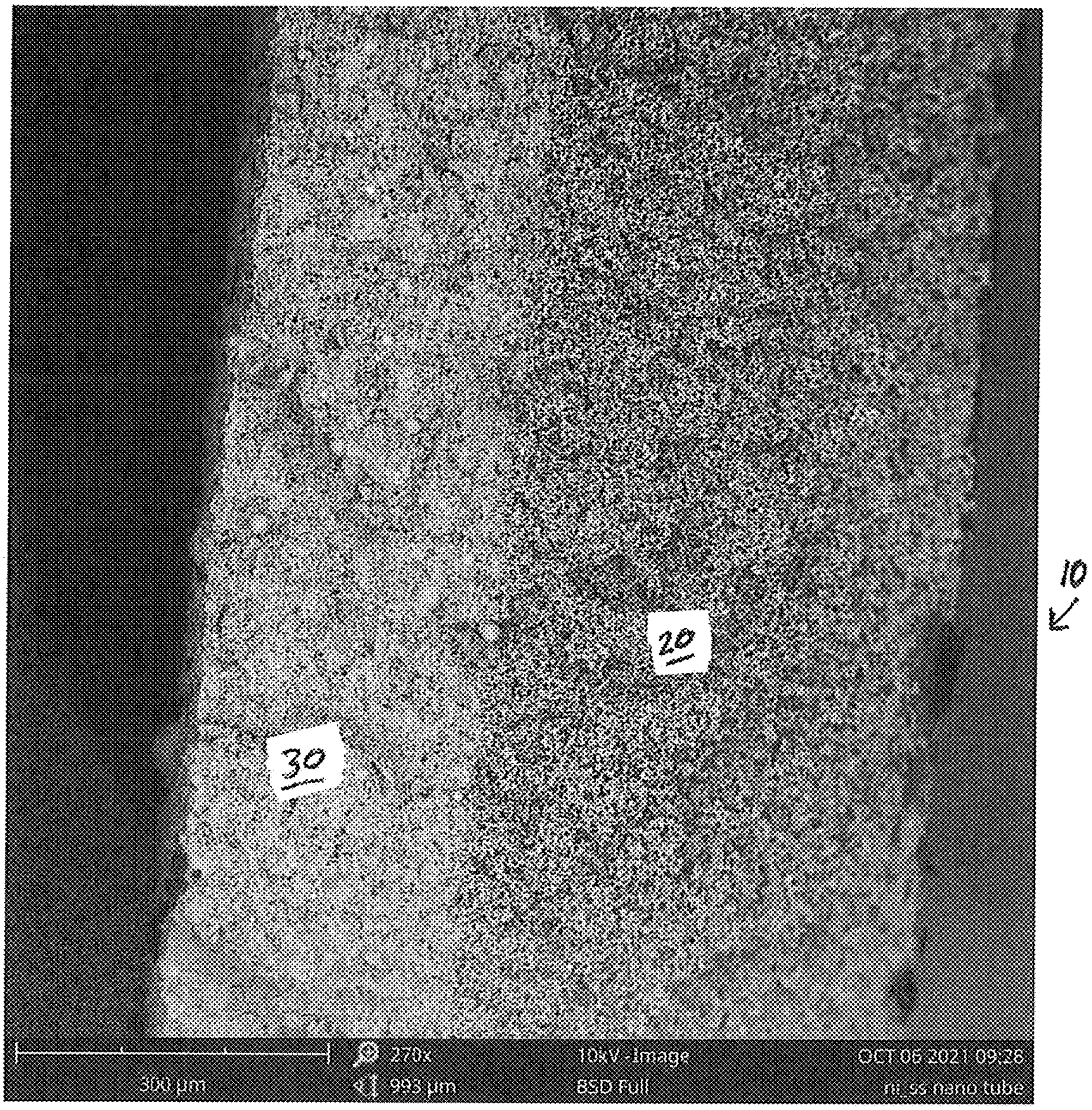
FIGS. 2A, 2B, and 2C are scanning electron microscope images of examples of a multi-layer membrane as described.
Figure 2B:
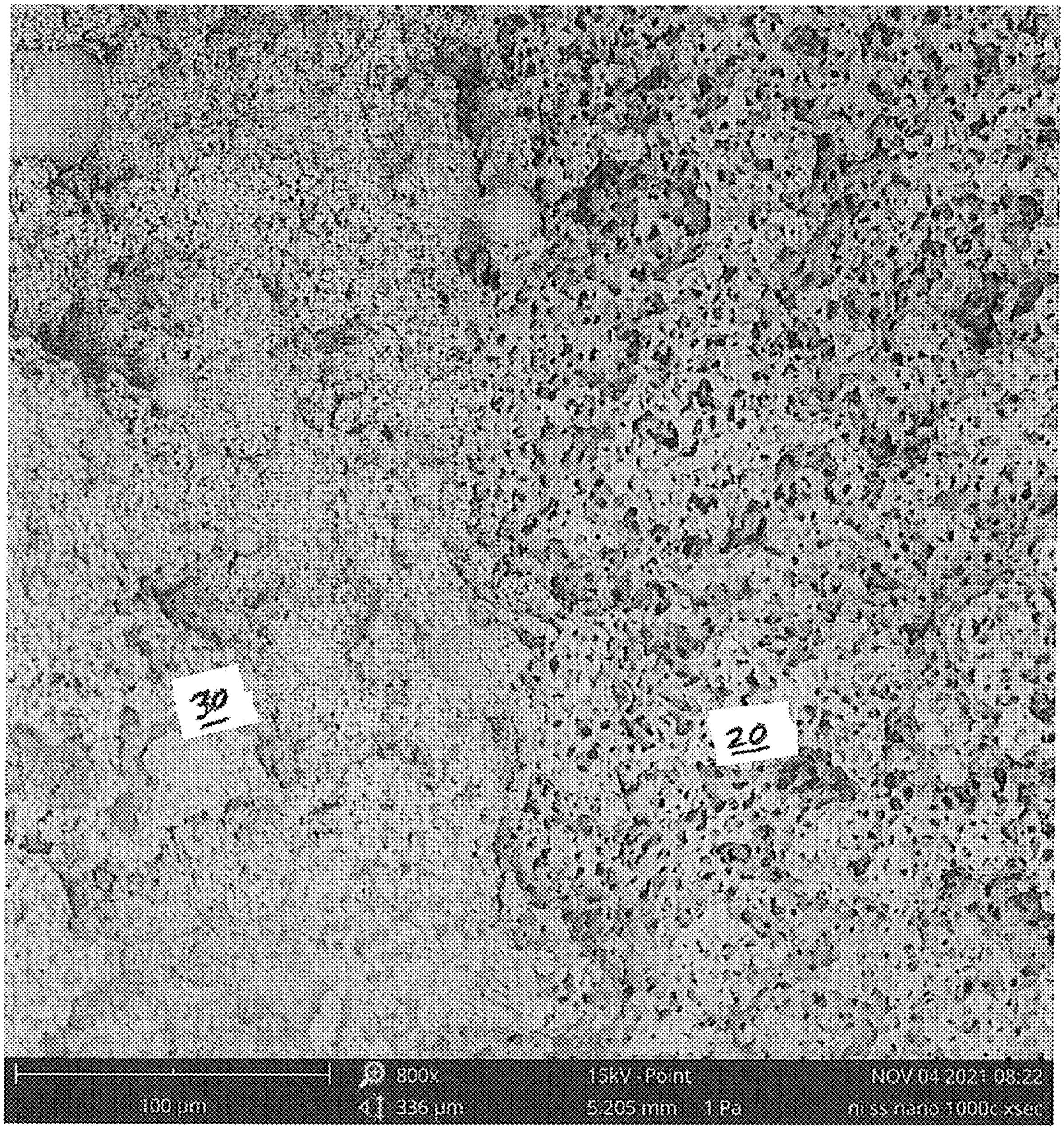
Figure 2C:
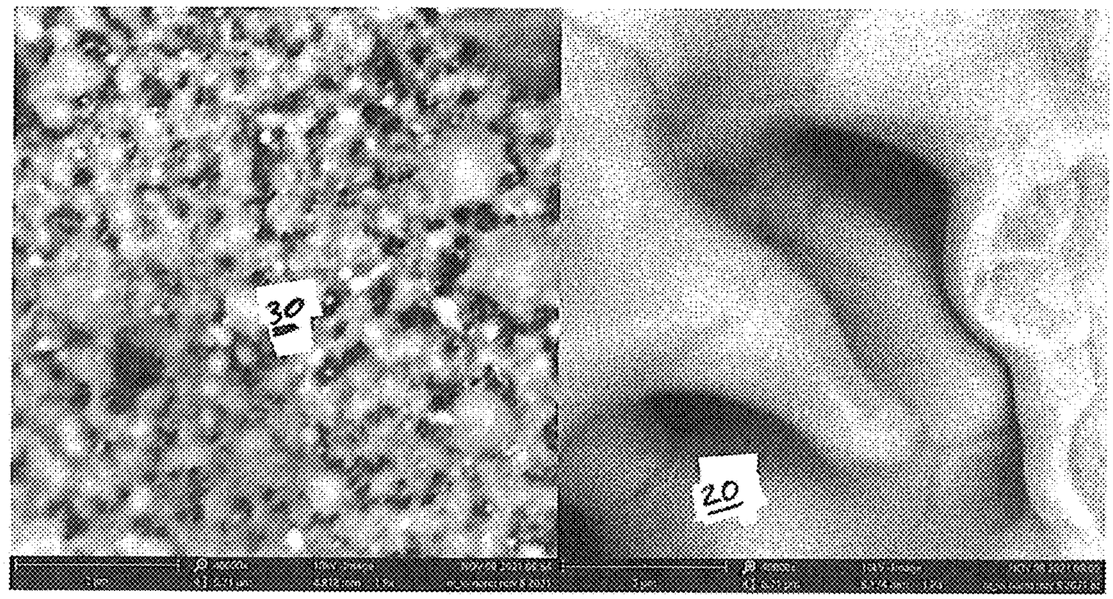

FIGS. 2A, 2B, and 2C are photomicrograph images of examples porous sintered membranes of the present description, schematically shown at FIG. 1. FIGS. 2A and 2B show images of multi-layer porous sintered membrane 10 at different magnifications. Membrane 10 includes coarse layer 20 made entirely of coarse particles 22, and fine layer 30 made entirely of fine particles 26. The sintered particles are interconnected at surfaces of the particles to form the porous sintered membrane FIG. 2C shows fine layer 30 (left side) and coarse layer 20 (right side) of membrane 10 of FIGS. 2A and 2B at higher magnification. FIG. 2C show a comparison of the different pore structures of coarse layer 20 and fine layer 30. Fine layer 30 has a higher number of pores, with the pores being much smaller compared to a smaller number of much larger pores of coarse layer 20. Fine layer 30 also has a higher porosity compared to coarse layer 20.

Figure 3A:
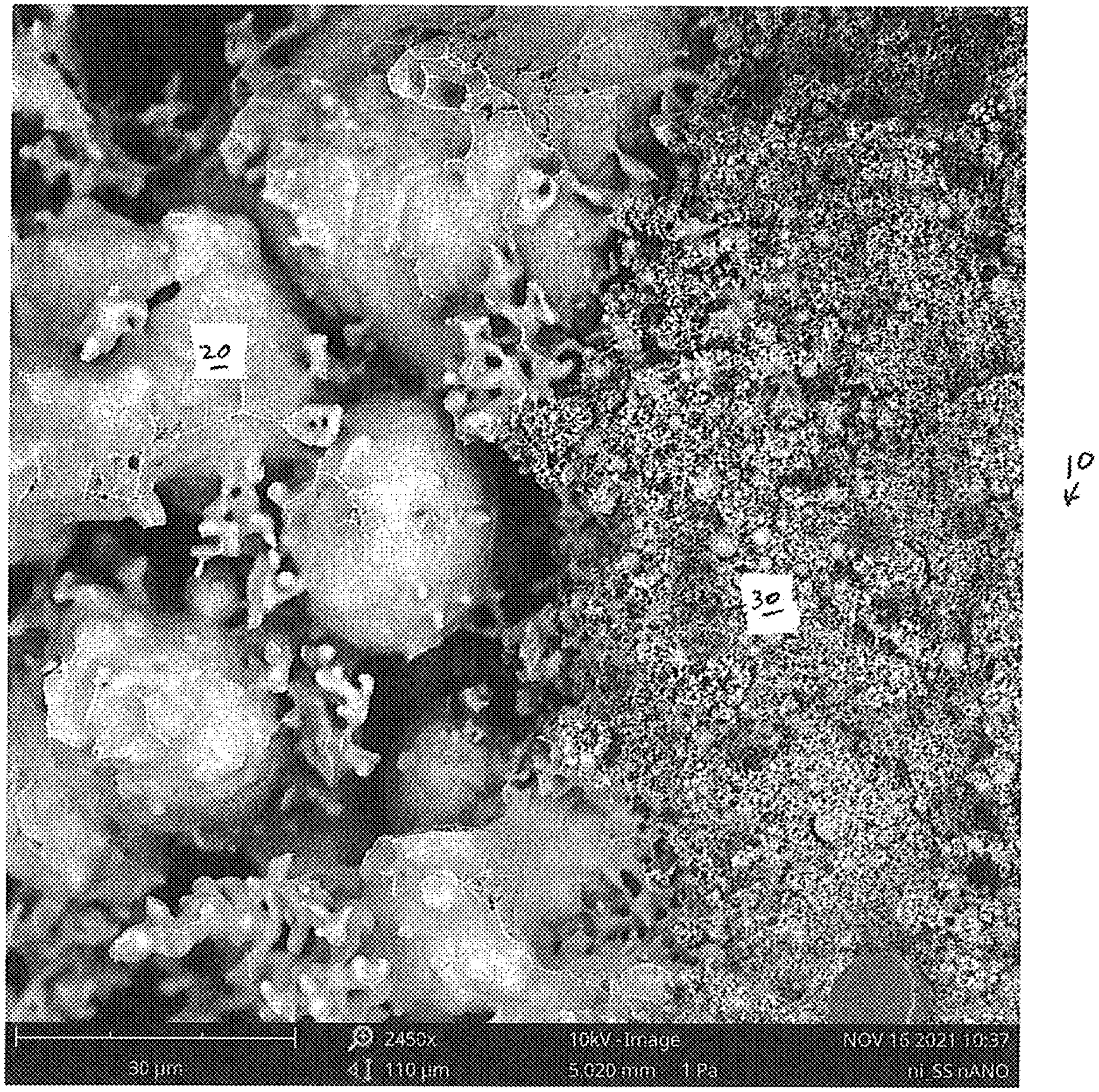
FIGS. 3A and 3B are scanning electron microscope images of examples of a multi-layer membrane as described.
Figure 3B:
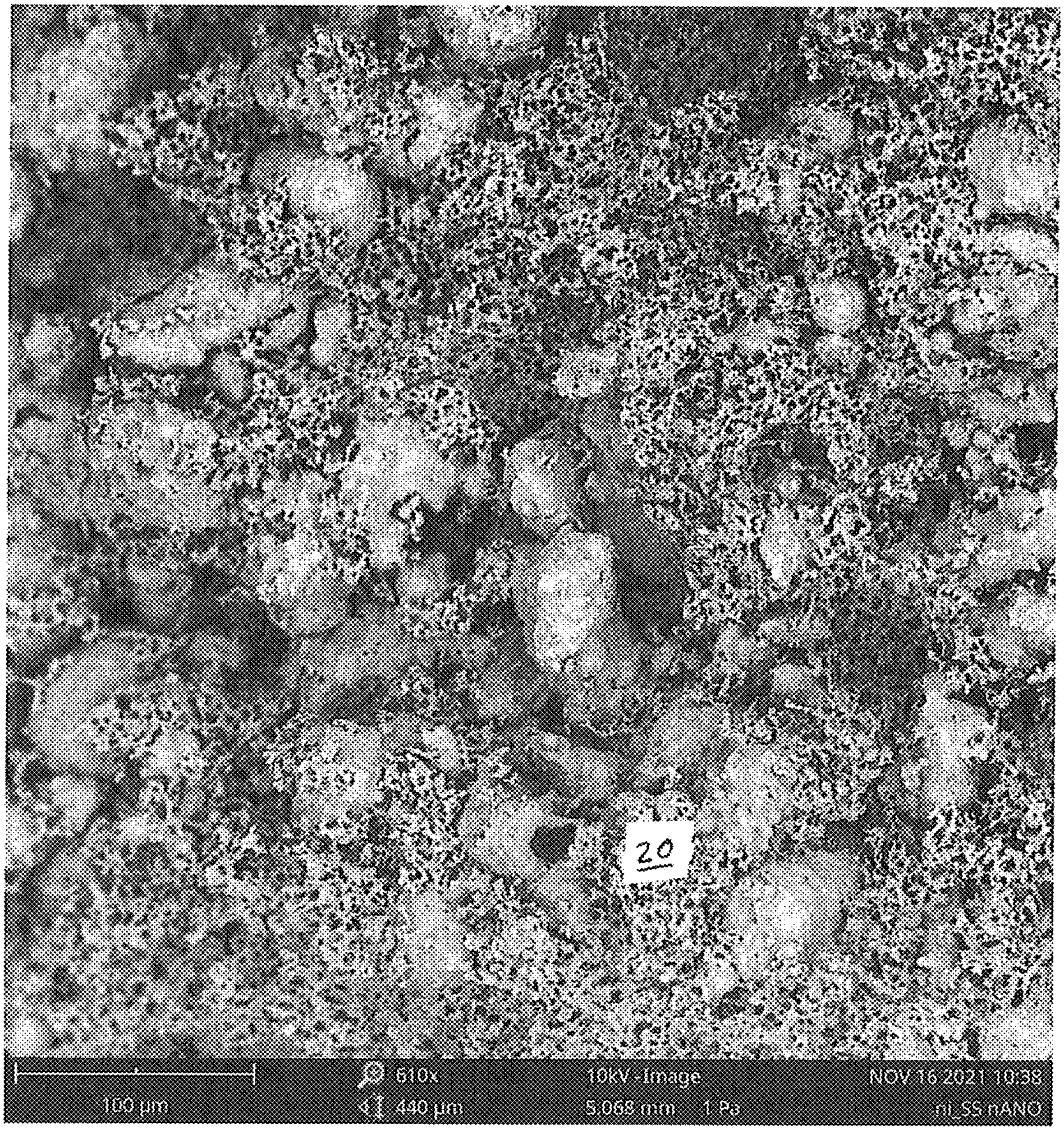

FIGS. 3A and 3B are photomicrograph images of examples porous sintered membranes or the present description, schematically shown at FIG. 1. FIGS. 3A and 3B show images of multi-layer porous sintered membrane 10 at different magnifications. Membrane 10 includes coarse layer 20 made of a mix of coarse particles 22 having different particle sizes (50 to 100 microns and 2 to 3 microns), and fine layer 30 made entirely of fine particles 26. FIG. 3A shows both layers and FIG. 3B shows only coarse layer 20, at a lower magnification.

Examples of porous sintered membranes as described may be useful as a filter membrane to remove particles or contamination from a flow of fluid directed through the filter membrane. The fluid may be any type of fluid, including a gas, a liquid, or a supercritical fluid. The fluid may be any fluid that requires filtering, including as a particular example superfluid carbon dioxide that contains an impurity at a low level, from any source. Supercritical carbon dioxide is useful for processing or fabricating semiconductor and microelectronic devices. The porous sintered body may effectively remove contaminants from a fluid stream by a sieving or a non-sieving filtration mechanism, or both. When the fluid is a supercritical carbon dioxide, filtration may predominantly occur by a non-sieving filtration mechanism.

The pressure of a fluid that is handled by a filtering system during a step of filtering the fluid using a filter membrane as described can be as desired. For methods and equipment used to filter certain types of fluids, including supercritical carbon dioxide, the pressure of fluid within a filtering system, e.g., as the fluid passes through a filter membrane, is relatively high, such as at least 10, 20, or up to or in excess of 30 megapascal (MPa).

A pressure differential (or "pressure drop") across a thickness of a filter membrane as described (between an upstream side of the filter and a downstream side of the filter), during use of the filter membrane, can be any pressure differential that allows for desired effectiveness (e.g., particle retention and flow rate) during filtering, and that is commercially feasible. For use to filter supercritical carbon dioxide at elevated pressure a pressure differential across the filter membrane can be at least 1, 2, or 3 megapascal (MPa).

The amount of a fluid that flows through a filter membrane (volume through the filter per time) during a filtering step can be an amount that allows for desired effectiveness (e.g., particle retention) during the filtering step, and that is also commercially feasible.

The temperature of a flow of fluid through a filter membrane as described can be any temperature that allows for commercially effective filtering. For filtering supercritical carbon dioxide, a temperature may be relatively high, such as a temperature of at least 100, 150, or 200 degrees Celsius.

A sintered membrane as described can be prepared by a multi-step process of forming a precursor that contains a first layer made substantially or entirely of microparticles as descried, forming on a surface of the first layer a second layer made substantially or entirely of nanoparticles as described, then sintering the precursor (made of the first layer and the second layer) to cause the particles of the layers to bond together to form a multi-layer porous sintered membrane.

In certain example methods, a precursor can be formed by dry methods that use dry powders of metal particle without the need for any polymer or other liquid component being present within the powder. A first layer of a precursor can be formed by molding the first layer from a first dry powder that includes (comprises, consists of, or consists essentially of) at least a major portion of microparticles as described, to form a first layer green body, e.g., using an isotactic molding technique. The precursor may be formed by molding the particles and applying pressure to the molded particles in an amount of at least 5,000 pounds per square inch, gauge (psig), e.g., at least 8,000, 10,000, or at least 15,000 psig.

After a first layer green body is formed, a dry powder that contains (comprises, consists of, or consists essentially of) nanoparticles (that is made entirely or nearly entirely of nanoparticles) are applied uniformly to a surface of the first layer green body and compressed against the surface, again by an isotactic molding technique. The nanoparticles are compressed against the first layer green body at a pressure that is below the pressure used to compress the first layer green body, e.g., a pressure that is less than 5,000 pounds per square inch, gauge (psig), e.g., less than 2,000 psig, or less than 1,500 psig, or less than 1,000 psig.

The resultant green body having a first (coarse) layer and a second (fine) layer is then sintered to produce a sintered porous body having a coarse layer and a fine layer as described. The green body and each of its two separate layers may consist of or consist essentially of the compressed layers produced from the powders, and do not require and may not include any other material such as a polymer (binder), surfactant, solvent, or the like.

In added detail, according to one example step, a collection of particles in the form of a dry powder that includes mostly or entirely (consists of or consists essentially of) coarse particles is molded under pressure of at least 5,000 psig to compress the particles to form a thin membrane, e.g., in the form of a small tube. By one technique, the molding step can be of a type referred to as isotactic molding, or isotactic wet pressure molding. (See, e.g., U.S. Pat. No. 7,534,287, the entirety of which is incorporated herein by reference.) The membrane that is produced, which contains mostly or entirely coarse particles compressed together by the molding step, will become a first layer of a porous sintered membrane. The membrane is held together by the contact produced between the particles by the compression of the particles. The membrane, referred to as a "precursor" or a "green body," which specifically here is a "first layer precursor," is self-supporting yet fragile.

A second collection of particles contains mostly or entirely (consists of or consists essentially of) fine particles, i.e., nanoparticles. This collection of particles is applied to one surface of the first layer precursor, e.g., is applied to an outer surface of a first layer precursor that is in the form of a tube. The nanoparticles are applied in a manner to place a uniform and even amount of nanoparticles over the surface of the first layer precursor. Effective methods of applying the nanoparticles to the surface are known and include methods referred to as "air laying" techniques, such as by placing a screen or mesh over the surface of the first layer, then passing the nanoparticles through the screen, optionally with the use of a brush for evenly distributing the particles.

After evenly placing the nanoparticles over the surface of the first layer, the resultant body is again molded under pressure to compress the nanoparticles against the first layer and to form the second layer compressed on the surface of the first layer. The amount of pressure applied to the nanoparticles placed on the first layer is less than 5,000 psig, e.g., less than 2,000 psig, or less than 1,000 psig. Molding and compressing the nanoparticles onto the surface of the first layer can be performed by an isotactic molding technique, e.g., an isotactic wet pressure molding technique. The resulting precursor ("green body") contains the compressed and non-sintered first layer made from the coarse particles and the compressed and sintered second layer made from the nanoparticles.

In a subsequent step, the precursor is sintered at a sintering temperature that will be effective to bond the particles of both layers into a single porous multi-layer sintered membrane. During sintering, the fine particles of the fine layer and the coarse particles of the coarse layer will preferably experience similar levels of sintering, and similar sinter shrinkage, which can result in stability of the sintered membrane and can prevent cracking and distortion of the membrane during sintering.

The filter membrane may be included in a filtering system or apparatus that includes a filter housing that contains and supports the filter membrane at a location of a fluid flow, to cause the fluid to flow through the membrane when the fluid passes through the filter housing. The filter housing can have an inlet, an outlet, and an internal volume that contains the filter membrane.

Figure 4:
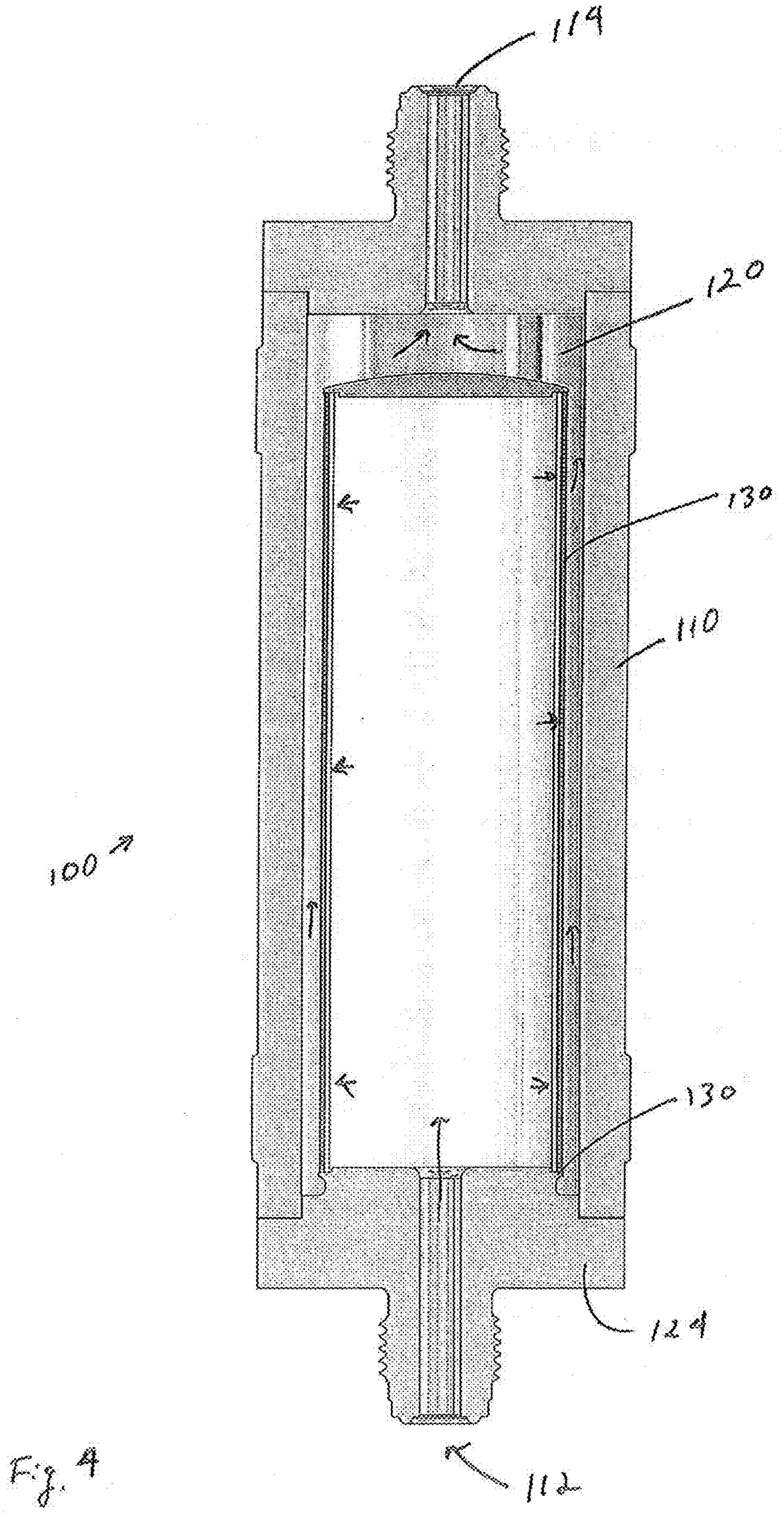
FIG. 4 is an example of a filter apparatus that includes a multi-layer membrane as described.

An example of a filter housing (in cross-section) is shown at FIG. 4. Example filter housing 100 includes housing body 110, fluid inlet 112, fluid outlet 114, and interior 120. Tubular multi-layer porous sintered membrane 130 is contained at interior 120, for example by being welded to housing base 124 at weld 130. In use, fluid (not shown) flows as indicated by the arrows into inlet 112, through filter membrane 130, through interior 120, and exits the filter housing through outlet 114.

Example 1

| # | Membrane | ASTM E128 Bubble point (60/40 IPA)-psi | Flow/unit area at 30 psi-slpm/cm^2 |
|---|---|---|---|
| 1 | present disclosure* | 70 | 0.2 |
| A | U.S. Pat. No. 7,534,287 | 13 | 0.65 |
| B | U.S. Pat. No. 7,534,287 | 26 | 0.07 |

Example membranes prepared according to the disclosure may exhibit a relatively high bubble point (due to relatively small pore size) compared to existing commercially available products in combination with relatively high level of flow through the membrane.

Example 1 is a porous sintered filter membrane as describe herein. The membrane contains a coarse layer that is made of nickel particles having an average size (diameter) in a range from 2 to 3 microns, and that has a porosity in a range from 10 to 20 percent. The membrane contains a fine layer that is made of stainless steel nanoparticles, and that has a porosity that is higher than the porosity of the coarse layer, such as a porosity in a range from 30 to 40 percent.

Examples A and B are tubular porous membranes that were prepared based on the description of U.S. Pat. No. 7,534,287. Examples A and B were prepared from nickel particles that include fine dendritic particles and nanoparticles, but no coarse particles (as that term is used herein). The Example A and Example B membranes included an inner layer prepared from only the fine dendritic nickel particles, and an outer layer prepared from a blend of the fine dendritic nickel particles and nickel nanoparticles.

Example 2

A tubular rubber isostatic mold with an outer diameter of 2.1 centimeter and an inner steel mandrel of 1.9 cm diameter and 17 cm long is filled with 2-3 micron Ni powder (reference VALE Ni type 255). The filled mold is isostatically pressed at 10,000 pounds per square inch. After the powder is compressed, there exists an annular space between the rubber mold and green compact (precursor) still on the steel mandrel. This annual space is then filled with a 60-150 nanometer diameter stainless steel nano powder (ref: Sky Springs-0964XH) and pressed at 1,000 psi.

The 2-layer green compact was removed from the mold and the central steel mandrel removed. The compact was placed in a Vacuum/Hydrogen furnace and sintered at 1010 C for 60 minutes.

A portion of the sintered tube was cut to 15 mm and subject to a Radial Crush Test. The outer layer of the tube began to crack at a "K" value of 39 KSI. A 104 mm length of the sintered tube was cut and the flow measured. It had an air flow of 0.13 slpm/cm^2 at 30 psi. The bubble point was measured to be 80 psi in 60/40 IPA/water.

Evaluation of the nano (fine) and coarse layer's porosity showed the nano (fine) layer to be 230 microns thick with a porosity of 27 percent and the coarse layer a thickness of 700 microns and a porosity of 17 percent.

The membrane is shown at FIGS. 2A, 2B, and 2C.

Example 3

A tubular rubber isostatic mold with an OD of 2.1 cm and an inner steel mandrel of 1.9 cm diameter and 17 cm long was filled with a blend of 2-3 micron Ni powder (reference VALE Ni type 255) 70 percent by mass, and 50 to 100 micron Ni powder (reference Ametek XXX) 30 percent by mass. The filled mold was isostatically pressed at 12,000 psi. The annular space was filled with a 60-150 nanometer diameter stainless steel nanopowder (ref: Sky Springs-0964XH) and pressed at 1,000 psi. The Radial crush "K" value for 18 mm was 38 KSI, the 60/40 IAP/water bubble point 70 psi and the air flow/unit area at 30 psi was 0.17 slpm/cm^2.

Evaluation of the nano (fine) and coarse layer porosities showed the nano (fine) layer to be 250 microns thick with a porosity of 35 percent and the coarse layer a thickness of 800 microns and a porosity of 16 percent. The membrane is shown at FIGS. 3A and 3B.

Aspects

Aspect 1. A multi-layer porous sintered membrane comprising: a coarse layer comprising sintered microparticles, the microparticles having a microparticle sintering point, the coarse layer having a coarse layer porosity; and a fine layer comprising sintered nanoparticles, the nanoparticles having a nanoparticle sintering point, the fine layer having a fine layer porosity, the nanoparticle sintering point being greater than the microparticle sintering point, and the fine layer porosity being greater than the coarse layer porosity.

Aspect 2. The membrane of Aspect 1, wherein the membrane is tubular, and the coarse layer is an inner layer.

Aspect 3. The membrane of Aspect 1 or 2, wherein the coarse layer porosity is in a range from 10 percent to 30 percent.

Aspect 4. The membrane of any of Aspects 1 through 3, wherein the fine layer porosity is in a range from 25 percent to 45 percent.

Aspect 5. The membrane of any of Aspects 1 through 4, wherein the sintered nanoparticles are formed from nanoparticles having an average size in a range from 10 to 200 nanometers.

Aspect 6. The membrane of any of Aspects 1 through 5, wherein the fine layer comprises at least 90 weight percent sintered nanoparticles, based on total weight of the fine layer.

Aspect 7. The membrane of any of Aspects 1 through 6, wherein the sintered microparticles are formed from microparticles having an average size in a range from 1 to 100 microns.

Aspect 8. The membrane of any of Aspects 1 through 7, wherein:

- the sintered microparticles are at least 90 weight percent nickel or nickel alloy, based on total weight sintered coarse particles, and
- the sintered nanoparticles are at least 90 weight percent stainless steel, based on total weight sintered nanoparticles.

Aspect 9. The membrane of any of Aspects 1 through 8, having a bubble point that is at least 50 pounds per square inch measured by ASTM E218-99, measured by using isopropyl alcohol and water (60/40).

Aspect 10. The membrane of any of Aspects 1 through 9, having a flow per unit area of at least 0.10 (measured at 30 psi-slpm/square centimeter).

Aspect 11. The membrane of any of Aspects 1 through 10, wherein:

- the membrane has a thickness in a range from 500 to 1500 microns,
- the coarse layer has a thickness in a range from 500 to 1200 microns, and
- the fine layer has a thickness in a range from 2 to 400 microns.

Aspect 12. A filter assembly comprising a filter housing that contains a membrane of any of Aspects 1 through 11.

Aspect 13. A method of processing supercritical carbon dioxide, the method comprising passing supercritical carbon dioxide through a membrane of any of Aspects 1 through 11.

Aspect 14. The method of Aspect 13, wherein a pressure differential across the membrane is at least 1 megapascal.

Aspect 15. A method comprising:

- compressing microparticles into a coarse layer using a first compression pressure, the microparticles having a microparticle sintering point, and
- forming a fine layer on the coarse layer by applying nanoparticles to the coarse layer and compressing the nanoparticles using a second compression pressure that is lower than the first compression pressure, to form a precursor comprising the coarse layer and the fine layer, wherein the nanoparticles have a nanoparticle sintering point that is greater than the microparticle sintering point.

Aspect 16. The method of Aspect 15, wherein the first compression pressure is at least 5,000 pounds per square inch.

Aspect 17. The method of Aspect 15 or 16, wherein the second compression pressure is below 1,500 pounds per square inch.

Aspect 18. The method of any of Aspects 15 through 17, wherein the precursor is tubular and the coarse layer is an inner layer and the fine layer is an outer layer.

Aspect 19. The method of any of Aspects 15 through 18, wherein the nanoparticles have an average size in a range from 10 to 200 nanometers.

Aspect 20. The method of any of Aspects 15 through 19, wherein the fine layer comprises at least 90 weight percent nanoparticles, based on total weight fine layer.

Aspect 21. The method of any of Aspects 15 through 20, wherein the microparticles have an average size in a range from 1 to 100 microns.

Aspect 22. The method of any of Aspects 15 through 21, wherein:

- the microparticles are at least 90 weight percent nickel or nickel alloy, based on total weight coarse particles, and
- the nanoparticles are at least 90 weight percent stainless steel, based on total weight nanoparticles.

Aspect 23. The method of any of Aspects 15 through 22, comprising sintering the precursor at a sintering temperature that causes sintering of the microparticles and sintering of the nanoparticles to form a multi-layer porous sintered membrane that comprises a coarse layer comprising the sintered coarse particles and a fine layer comprising the sintered nanoparticles.

Aspect 24. The method of Aspect 23, wherein the coarse layer has a coarse layer porosity, and the fine layer has a fine layer porosity that is greater than the coarse layer porosity.

Aspect 25. The method of Aspect 23 or 24, wherein the coarse layer porosity is in a range from 10 to 30 percent.

Aspect 26. The method of any of Aspects 23 through 25, wherein the fine layer porosity is in a range from 25 percent to 45 percent.

Aspect 27. The method of any of Aspects 23 through 26, wherein the multi-layer porous sintered membrane has a bubble point that is at least 50 pounds per square inch measured by ASTM E218-99, measured by using isopropyl alcohol and water (60/40).

Aspect 28. The method of any of Aspects 23 through 27, wherein the multi-layer porous sintered membrane has a flow per unit area of at least 0.10 (measured at 30 psi-slpm/square centimeter).

Aspect 29. The method of any of Aspects 23 through 28, wherein:

- the multi-layer porous sintered membrane has a thickness in a range from 500 to 1500 microns,
- the first layer has a thickness in a range from 500 to 1200 microns, and
- the second layer has a thickness in a range from 2 to 400 microns.

The invention claimed is:

1. A multi-layer porous sintered membrane comprising:

- a coarse layer comprising sintered microparticles, the microparticles having a microparticle sintering point, the coarse layer having a coarse layer porosity, and
- a fine layer comprising sintered nanoparticles, the nanoparticles having a nanoparticle sintering point, the fine layer having a fine layer porosity, the nanoparticle sintering point being greater than the microparticle sintering point, and the fine layer porosity being greater than the coarse layer porosity.

2. The membrane of claim 1, wherein the membrane is tubular, and the coarse layer is an inner layer.

3. The membrane of claim 1, wherein the coarse layer porosity is in a range from 10 percent to 30 percent.

4. The membrane of claim 1, wherein the fine layer porosity is in a range from 25 percent to 45 percent.

5. The membrane of claim 1, wherein the sintered nanoparticles are formed from nanoparticles having an average size in a range from 10 to 200 nanometers.

6. The membrane of claim 1, wherein the fine layer comprises at least 90 weight percent sintered nanoparticles, based on total weight of the fine layer.

7. The membrane of claim 1, wherein the sintered microparticles are formed from microparticles having an average size in a range from 1 to 100 microns.

8. The membrane of claim 1, wherein:

the sintered microparticles are at least 90 weight percent nickel or nickel alloy, based on total weight sintered coarse particles, and the sintered nanoparticles are at least 90 weight percent stainless steel, based on total weight sintered nanoparticles.

9. The membrane of claim 1, having a bubble point that is at least 50 pounds per square inch measured by ASTM E218-99, measured by using isopropyl alcohol and water (60/40).

10. The membrane of claim 1, having a flow per unit area of at least 0.10 (measured at 30 psi-slpm/square centimeter).

11. The membrane of claim 1, wherein:

the membrane has a thickness in a range from 500 to 1500 microns, the coarse layer has a thickness in a range from 500 to 1200 microns, and the fine layer has a thickness in a range from 2 to 400 microns.

12. A filter assembly comprising a filter housing that contains a membrane of claim 1.

13. A method of processing supercritical carbon dioxide, the method comprising passing supercritical carbon dioxide through a membrane of claim 1.

14. The method of claim 13, wherein a pressure differential across the membrane is at least 1 megapascal.

* * * * *